UNITED STATES PATENT OFFICE.

ROBERT ALEXANDER, OF WASHINGTON, DISTRICT OF COLUMBIA, ASSIGNOR OF ONE-HALF, BY DIRECT AND MESNE ASSIGNMENTS, TO LOUIS W. SINSABAUGH AND THE BARBER ASPHALT PAVING COMPANY, BOTH OF SAME PLACE.

COMPOUND FOR INSULATING TELEGRAPH-WIRES, &c.

SPECIFICATION forming part of Letters Patent No. 351,611, dated October 26, 1886.

Application filed September 20, 1886. Serial No. 214,055. (No specimens.)

*To all whom it may concern:*

Be it known that I, ROBERT ALEXANDER, a citizen of the United States, residing at Washington, in the District of Columbia, have invented certain new and useful Improvements in Compounds for Insulating Telegraph-Wires and other Purposes, of which the following is a specification.

My invention relates to improvements in compounds for insulating telegraph-wires, and for other purposes.

The object of my invention is to provide a material which will not be readily effected by heat and cold, and which will completely insulate electrical telegraph wires, cables, &c., and at the same time be impervious to moisture and other destructive agents.

In carrying out my invention I take natural asphaltum, freed from all earthy matter by a refining process commonly practiced, and reduce it to a fluid or semi-fluid condition by means of heat and crude petroleum or the residuum of petroleum, and combine the same while in a heated condition with glass-flock, or mineral wool, and cement or carbonate of lime, in such proportions as may be desired to form a compound of any desired consistency, which can be laid in bulk, pressed into slabs or blocks, formed into pipes, or single wires or cables may be coated with the compound. These ingredients I prefer to use in about the following proportions: For each one hundred pounds of glass-flock, from sixty to seventy pounds of the liquid asphaltum in a highly-heated condition, and from twenty to thirty pounds of cement or carbonate of lime is added, and the whole mass stirred or mixed thoroughly. The quantity of cement to be added may be varied to meet the requirements of each particular case—*i. e.*, if a very hard material is to be formed, a larger amount of cement is used; but if a softer and more elastic body is desired a less amount of cement is added.

In covering wires or cables a small amount of cement is added to the asphaltum and glass-flock; but after the wires or cables have been covered with the compound the cement can be applied to the outside and rubbed into the soft and elastic covering.

For the coating of wires and cables I prefer to subject the mineral wool or glass-flock to a hot bath of boracic acid, in order to anneal or soften the fibers and render them more pliable. This enables me to finish the wires with a smooth surface without having any of the fibers to project beyond the surface.

The mineral wool or flass-flock which I prefer to use is made of glass-batch or of the glass-producing quartz, and must be free from metal or metallic oxides, so as to preserve intact the perfect insulating properties of the compound, and prevent any disturbance of the electrical currents by induction.

The insulating properties of asphaltum are well known, and as glass is one of the best insulators known, it will be readily seen that I have combined two well-known insulating materials into one compound, and am enabled to obtain the best results by its use when applied to electrical wires or cables.

In all cases I prefer to use the natural asphaltum—such as the Trinidad or Cuban—the same having been previously refined and freed from all earthy matter; but other suitable bituminous material may be used without departing from the spirit of my invention.

I have mentioned that my compound just described is specially adapted for the insulation of electrical telegraph wires or cables; but I do not confine myself to such use, as it may be employed to advantage in the covering of roofs, &c.

Having thus described my invention, what I claim, and desire to secure by Letters Patent, is—

1. A compound for insulating telegraph wires and cables, consisting of asphaltum, residuum of petroleum or crude petroleum, mineral wool or glass-flock, and cement or carbonate of lime, in substantially the proportions set forth.

2. A compound for insulating telegraph-wires, in which glass-flock or mineral wool is the principal ingredient, said flock being treated to a hot bath of boracic acid previous to being mixed with the other ingredients forming the compound, as set forth.

In testimony whereof I affix my signature in presence of two witnesses.

ROBERT ALEXANDER.

Witnesses:
 N. D. ADAMS,
 BENJ. F. GARDNER.